(No Model.) 3 Sheets—Sheet 1.

J. A. WADE & J. CHERRY.
DYNAMOMETER.

No. 496,962. Patented May 9, 1893.

Witnesses:
Fredk Langhorne,
Arthur Edwin Hutton,

Inventors:
Joseph Armytage Wade
John Cherry (No Model.) 3 Sheets—Sheet 2.
J. A. WADE & J. CHERRY.
DYNAMOMETER.
No. 496,962. Patented May 9, 1893.
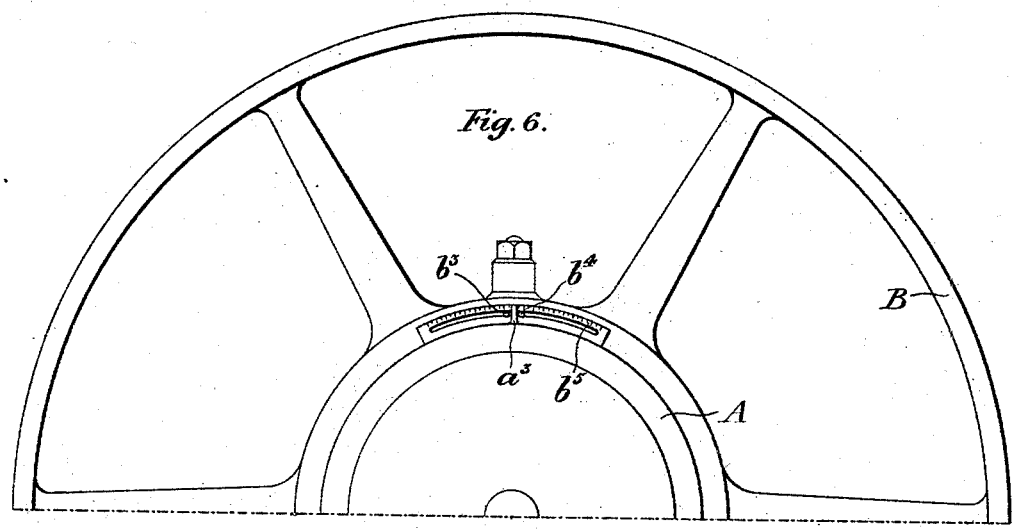
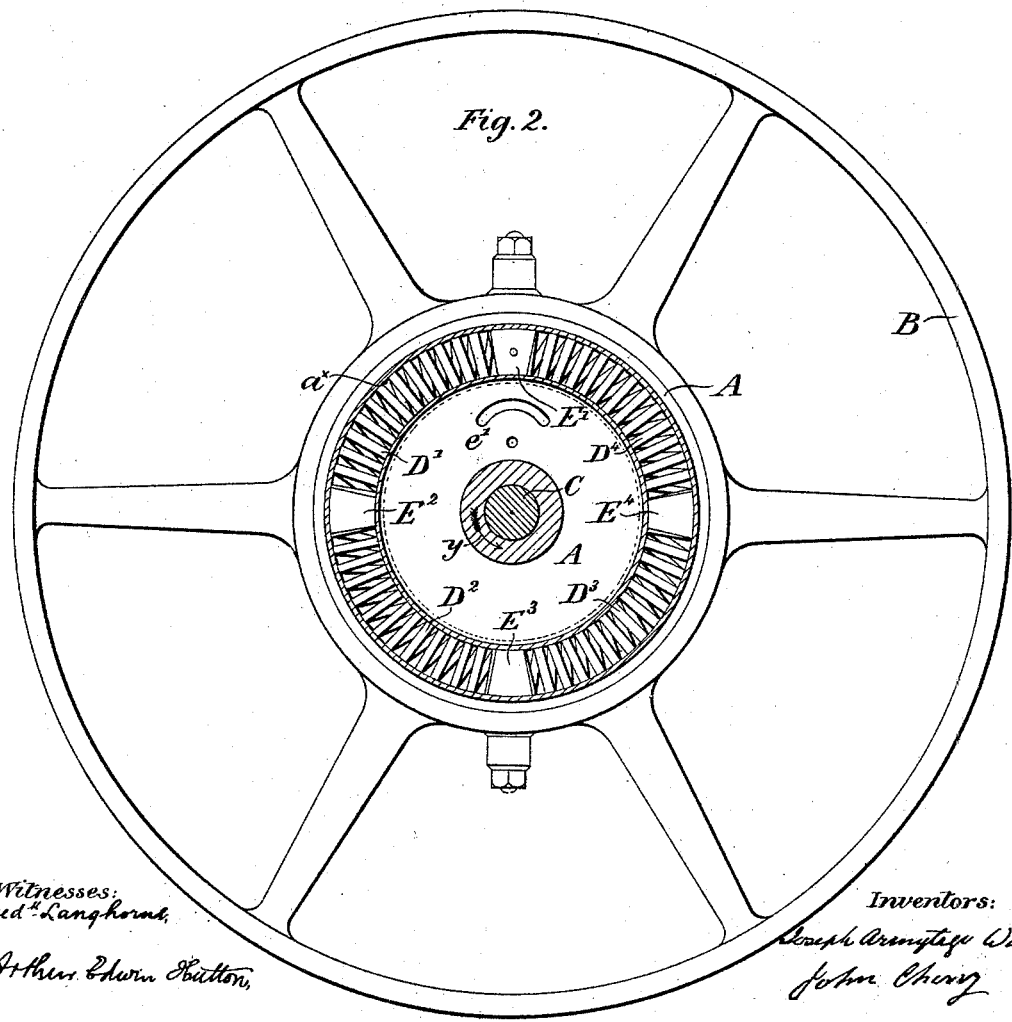
Witnesses:
Fred. Langhorne,
Arthur Edwin Hutton,
Inventors:
Joseph Armytage Wade,
John Cherry (No Model.) 3 Sheets—Sheet 3.

J. A. WADE & J. CHERRY.
DYNAMOMETER.

No. 496,962. Patented May 9, 1893.

Witnesses:
Frederick Langhorns,
Arthur Edwin Hutton,

Inventors:
Joseph Armytage Wade
John Cherry

UNITED STATES PATENT OFFICE.

JOSEPH ARMYTAGE WADE AND JOHN CHERRY, OF HORNSEA, ENGLAND.

DYNAMOMETER.

SPECIFICATION forming part of Letters Patent No. 496,962, dated May 9, 1893.

Application filed November 9, 1891. Serial No. 411,420. (No model.) Patented in England May 28, 1891, No. 9,080.

*To all whom it may concern:*

Be it known that we, JOSEPH ARMYTAGE WADE and JOHN CHERRY, subjects of the Queen of Great Britain and Ireland, residing at Hornsea, in the East Riding of the county of York, England, have invented new and useful improved means applicable for use in indicating, registering, communicating, and economizing motive power and in preventing shocks to machinery, (for which we have obtained Letters Patent in Great Britain, No. 9,080, bearing date May 28, 1891,) of which the following is a specification.

This invention relates to improved means applicable for use, first, in ascertaining and indicating or registering the amount of work being performed by, or the power of, a motor engine actuated by steam, water or other fluid under pressure, by the explosion of gas or vapor, by electricity or by any other source of power; secondly, in ascertaining the power communicated to a machine or system of machinery through a rotating shaft; thirdly, in economizing motive power by providing means for absorbing and subsequently utilizing any excessive power suddenly given out by the motor; and, lastly, in preventing or lessening shocks in engines or machinery, thereby reducing wear and tear.

Figure 1:
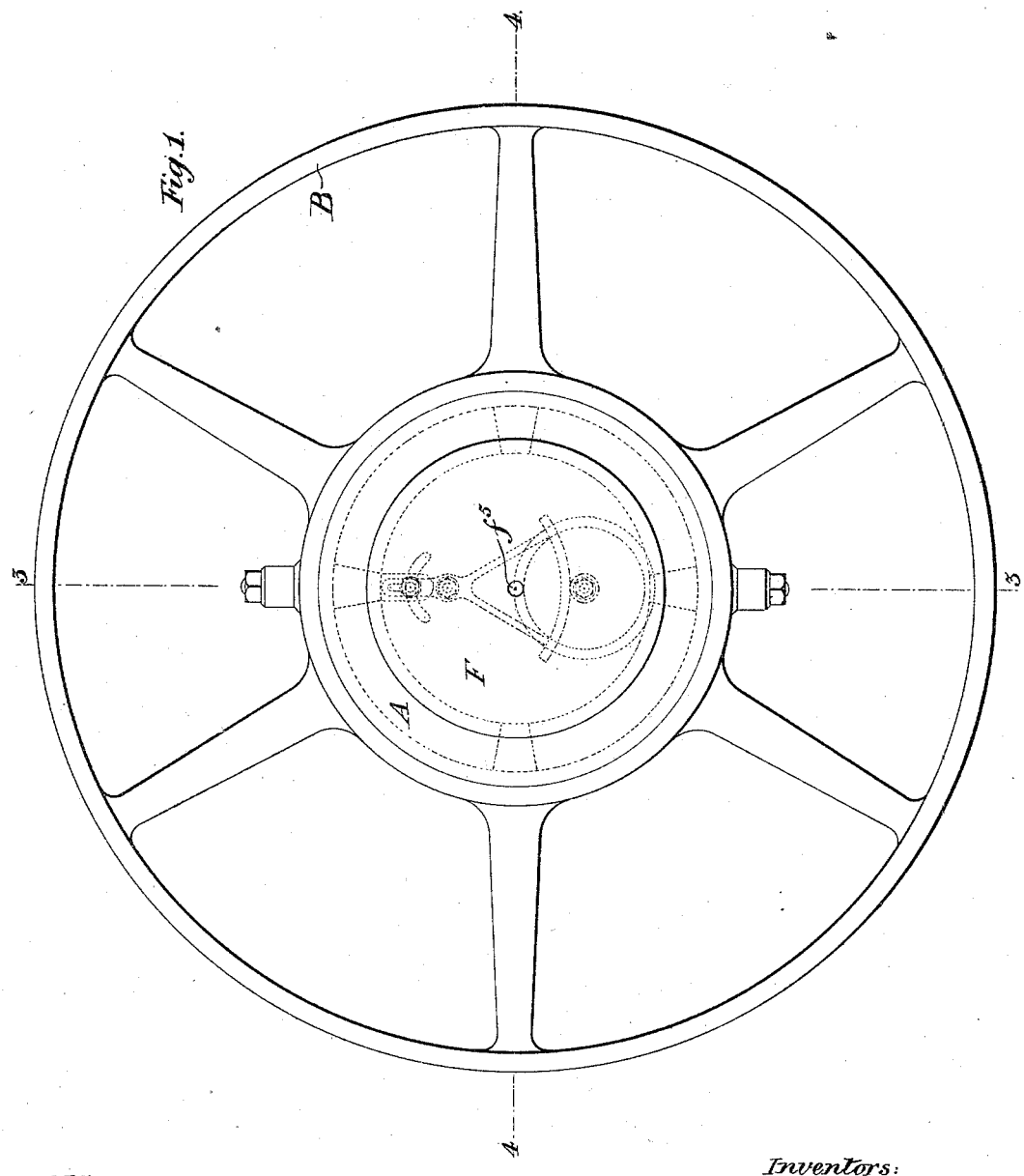
Figure 5:
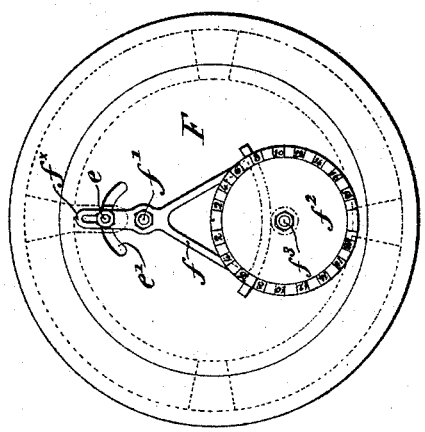
Figure 4:
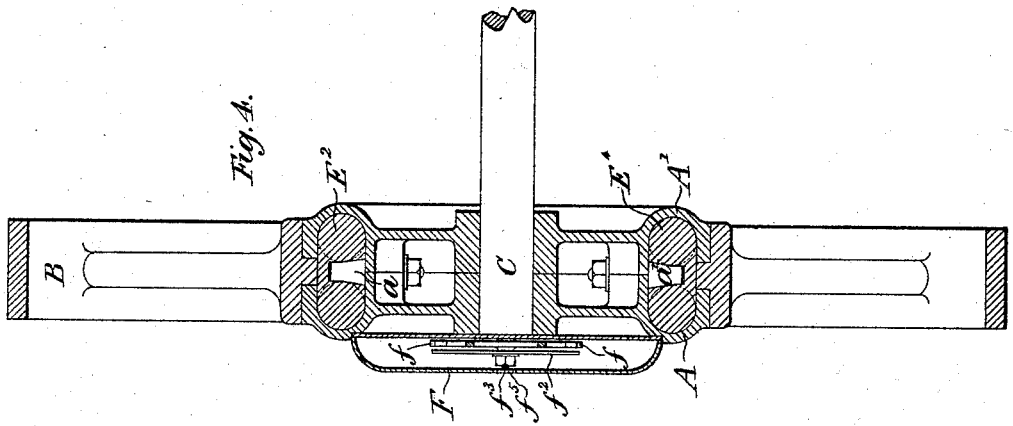
Figure 3:
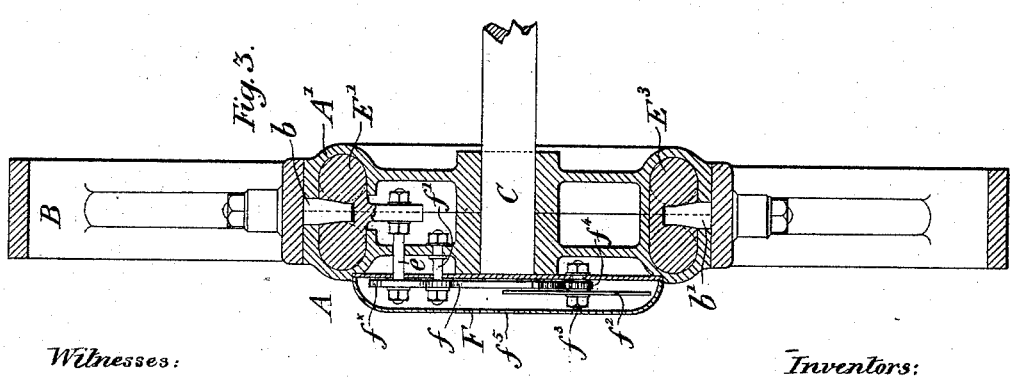

In the accompanying drawings, Figure 1 is a side elevation of a fly-wheel or driving rigger fitted with our invention. Fig. 2 is a similar view with the indicating device omitted, and part of the boss broken away to expose the spiral springs. Fig. 3 is a section on the line 3, 3 in Fig. 1; Fig. 4 being a section on the line 4, 4 in Fig. 1. Fig. 5 is a view of the indicating device with the cover removed. Fig. 6 illustrates a modified form of indicating device.

The boss A A' of the fly-wheel B, gear-wheel or driving rigger is preferably made in halves; both halves A and A' being keyed or otherwise secured to the shaft C. This wheel (hereinafter called the "fly-wheel") is loosely mounted on the boss A A', so as to be capable of rotating thereon independently for part of a revolution. The inner face of the half A of the boss A A' is formed with a cavity $a^x$ or cavities, in which spiral springs D' $D^2$ $D^3$ $D^4$ are arranged. The inner face of the half A' is similarly formed and furnished with similar springs. These springs are separated by chocks E' $E^2$ $E^3$ $E^4$ arranged at equal distances apart. The chocks E' and $E^3$ are connected to the fly-wheel B by the bolts $b$ and $b'$; the other chocks $E^2$ and $E^4$ being fixed to the boss A A' by the bolts $a$ and $a'$. These chocks serve to separate, and act as abutments for, the spiral springs. The chock E' is provided with a pin $e$ which projects through, and works in, a slot $e'$ in the outer half (A) of the boss. A casing F is attached to the said outer half. The casing contains a toothed sector $f f^x$ pivoted on the pin $f'$ and a dial $f^2$ pivoted on the pin $f^3$; the sector engaging with a pinion $f^4$ secured to the center of the dial $f^2$. The pin $e$ passes through a slot in the arm $f^x$ of the sector. The outer part of the casing is made with an aperture $f^5$, through which one of the numbers on the dial can be seen; the aperture, if at the end of a shaft, being concentric with the fly-wheel, as shown. If the shaft be a through shaft, the aperture is as near the circumference of the shaft as possible.

The operation of the parts is as follows:— Supposing, for example, that the shaft C is rotating in the direction indicated by the arrow $y$, and that, owing to excessive power being given out by the motor, the shaft C is rotating momentarily faster than the fly-wheel B, the chocks $E^2$ $E^4$ approach the chocks $E^3$ E'; the springs $D^2$ $D^4$ being compressed beyond their normal state of compression, and the springs D' $D^3$ expanding. When, owing to decreased power being derived from the motor, the fly-wheel B rotates momentarily faster than the shaft C, the reverse action of the chocks and consequently of the springs takes place; the springs D' $D^3$ being compressed beyond their normal state of compression, and the springs $D^2$ $D^4$ expanding. In any case, each of the springs, after a differential movement between the wheel and the boss has taken place, gradually acquires its normal amount of compression as the parts resume their original relative positions; the effect of the springs so acting in combination tending to turn the fly-wheel or the shaft in one direction or the other, thus acting with or against the motor, as the case may be, and regulating its action, as hereinafter more particularly referred to. The independent movement of the fly-wheel in respect to the boss, or vice versa, is indicated by the extent to which the dial $f^2$ has been turned by the pin $e$ and sector $f f^x$. By noting the position of the dial $f^2$ in regard to the aperture $f^5$, the amount of work which is being performed by the engine at any given time can be readily ascertained. The absorption of power by certain of the springs and the subsequent giving back of that power tends to prevent excessive or suddenly-diminished speed; thus indirectly regulating the working of the engine. Concussion arising from shocks on the breakage of the engine or machinery would, to a great extent, be absorbed by the springs; damage to the unbroken part of the plant being thus avoided or greatly reduced.

In Fig. 6, a pin $a^3$ and slides $b^3$ $b^4$ are substituted for the dial $f^2$ and the means employed for working the same. The pin $a^3$ is attached to the half A of the boss A A'; the slides $b^3$ $b^4$ sliding in the hub of the fly-wheel B. When there is a differential movement between the fly-wheel and the shaft, the pin $a^3$ moves the slide $b^3$ or $b^4$, which is held by friction in the extreme position to which it is moved, thus registering the power transmitted.

The scale $b^5$ shows the extent to which either slide or both slides has or have been displaced. After the power registered has been noted, the slide or slides may be pushed back into its or their normal position.

Less or more than eight springs may, if preferred, be employed. They may be arranged round the boss in a single instead of in a double row. The number of chocks carried by the fly-wheel and boss may likewise be increased or decreased. When it is not required to ascertain and indicate the power, the dial and its casing may be dispensed with. The boss, instead of being made in halves, may be in one piece and have a suitable cover. The springs, instead of being carried by that part of the boss keyed to the shaft, may be carried by that part of the boss to which the spokes are united.

What we claim as our invention, and desire to secure by Letters Patent, is—

1. The combination, with a shaft and a fly-wheel, gear-wheel or driving rigger mounted so as to rotate with the shaft and also to a limited extent independently about the axis of the shaft, of a spring arranged between the wheel and the shaft, and another spring similarly arranged and acting in the opposite direction, on either spring being compressed by the differential movement of the wheel and shaft the other spring expanding to a corresponding extent, substantially as and for the purposes herein set forth.

2. The combination, with a shaft and a fly-wheel, gear-wheel or driving rigger mounted so as to rotate with the shaft and also to a limited extent independently about the axis of the shaft, of chocks working in an annular space concentric with the shaft, and spiral springs arranged in that space and abutting against the chocks, one spring or set of springs expanding while the opposite or corresponding spring or set of springs is being compressed, substantially as and for the purposes herein set forth.

3. The combination, with a fly-wheel, gear-wheel or driving rigger B, chocks E' and $E^3$ carried by the wheel, a boss A A' keyed on the shaft, and chocks $E^2$ and $E^4$ carried by the boss and arranged with the chocks E' and $E^3$ equidistantly about the axis of the shaft C, of the spiral springs D', $D^2$, $D^3$ and $D^4$ placed between the chocks, the springs D' and $D^3$ expanding while the springs $D^2$ and $D^4$ are compressed, and vice versa, substantially as and for the purposes herein set forth.

4. The combination, with a shaft, a fly-wheel, gear-wheel or driving rigger mounted so as to rotate with the shaft and also to a limited extent independently about the axis of the shaft, a spring arranged between the wheel and the shaft, and another spring similarly arranged and acting in the opposite direction, on either spring being compressed by the differential movement between the wheel and the shaft the other spring expanding to a corresponding extent, of a device for indicating or registering the differential movement between the wheel and the shaft, substantially as and for the purposes herein set forth.

5. The combination, with a shaft and a fly-wheel, gear-wheel or driving rigger mounted so as to rotate with the shaft and also to a limited extent independently about the axis of the shaft, a spiral spring arranged between the wheel and the shaft, and another spiral spring similarly arranged and acting in the opposite direction, on either spring being compressed by the differential movement between the wheel and the shaft the other spring expanding to a corresponding extent, of a pin $e$, a sector $f f^\times$, a dial $f^2$, a pinion $f^4$, and an aperture $f^5$, substantially as and for the purposes herein set forth.

6. The combination, with a fly-wheel, gear-wheel or driving rigger B carrying chocks E' and $E^3$ and mounted rotatively on a boss A A' furnished with chocks $E^2$ and $E^4$, of the spiral springs arranged between the chocks, the pin $e$, the sector $f f^\times$, the dial $f^2$, the pinion $f^4$, and the aperture $f^5$, substantially as and for the purposes herein set forth.

7. The combination, with a fly-wheel, gear-wheel or driving rigger B carrying the chocks E' and $E^3$, and the said chocks E' and $E^3$, which work in a boss A A', of the boss A A', the chocks $E^2$ and $E^4$ carried by the boss, and spiral springs arranged between the chocks, substantially as and for the purposes herein set forth.

JOSEPH ARMYTAGE WADE.
JOHN CHERRY.

Witnesses:
FREDK. LANGHORNE,
   175 *St. George's Road, Hull.*
ARTHUR EDWIN HUTTON,
   *Patrington, Hull.*